Oct. 22, 1946.  A. A. SCHWARTZ  2,409,903
MACHINE FOR SHAPING STOCK
Filed Feb. 6, 1941  7 Sheets-Sheet 3

INVENTOR
Arthur A. Schwartz,
BY
Beau, Brooks, Buckley & Beau.
ATTORNEYS

Fig.7.

Patented Oct. 22, 1946

2,409,903

UNITED STATES PATENT OFFICE 2,409,903

MACHINE FOR SHAPING STOCK

Arthur A. Schwartz, Buffalo, N. Y., assignor to Bell Aircraft Corporation, Buffalo, N. Y.

Application February 6, 1941, Serial No. 377,640

4 Claims. (Cl. 90—13.2)

This invention relates to methods of handling stock in connection with mass production of duplicate work pieces and to machine tools for such purposes, and more particularly to improvements in quantity production methods and machine tools for the purpose of shaping stock in accord with the patterns of templets previously furnished.

One of the objects of the invention is to provide a simplified and improved method of handling sheet stock in connection with mass production operations involving multiple routing or other cutting or shaping processes. Another object of the invention is to provide an improved machine tool which is adapted to handle stacked sheet stock pieces in connection with routing or other shaping thereof, in an improved manner. Another object is to provide an improved machine tool which is adapted to operate from one or more templets or patterns upon one or more stock pieces in an improved manner. Other objects and advantages of the invention will appear in the specification hereinafter.

In accord with the method of the invention one or more sheets of stock material such as of Duralumin or other metal as used in connection with the aircraft manufacturing industry, for example, are mounted in vertically stacked relation upon a horizontal table portion of the machine of the invention, while a templet for guiding the operations of routing or other forming processes upon the stock is similarly mounted upon the table at a position opposite the stacked stock.

The stack of stock pieces may be rigidly mounted upon the work table by means of fastening devices driven through drilled openings therein. The routing mechanism is then moved into position over the templet and the work stack, and a control stylus thereof is then manually guided and caused to move relative to the templet in an improved manner to trace the outlines thereof while the routing mechanism is operating upon the work pieces and duplicating the pattern of the templet therein.

Figure 1:
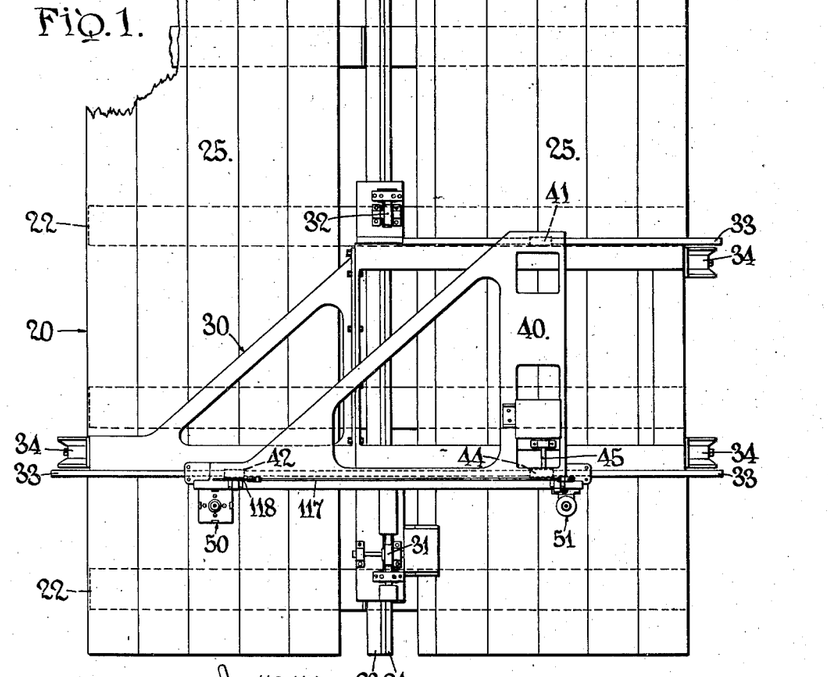
Fig. 1 is a fragmentary plan of a duplicating router portion of a machine of the invention.
Figure 2:
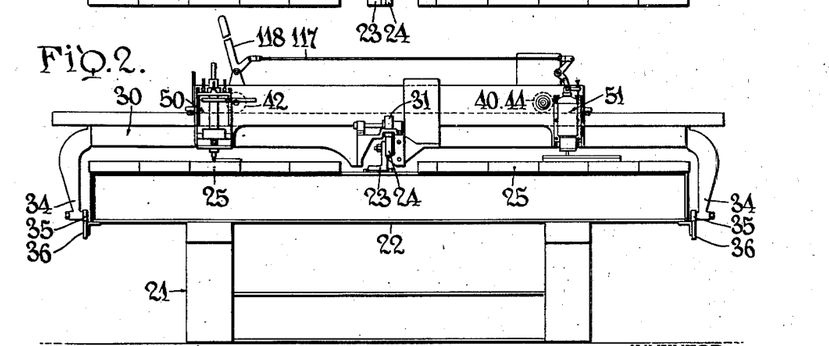
Fig. 2 is an end view thereof.

The drawings illustrate a machine of the invention as comprising a horizontal table designated generally at 20 and including suitable supporting structure designated generally at 21. The table supporting structure includes spaced transverse beams 22 upon which is mounted a central rail 23 extending longitudinally of the table. The rail 23 is provided with a tread piece 24 of hardened metal with an accurately ground upper face so as to be adapted to support in smoothly rolling relation thereon a rolling carriage portion of the machine as will be explained hereinafter. The table frame is provided with a wooden table top 25 at opposite sides of the central rail 23 (Figs. 1 and 2).

The routing mechanism includes a pair of carriages mounted for longitudinal and transverse movements, respectively, relative to the center rail 23. More specifically, a lower router carriage 30 is mounted upon the center rail tread 24 by means of mounting rollers 31 and 32 at opposite ends of the carriage 30. The carriage 30 includes spaced parallel frame portions 33 extending transversely of the table 20 and provided with stirrups 34 at overhanging end portions thereof; the stirrups extending downwardly at opposite sides of the table and being provided with rollers 35 arranged in rolling engagement with tracks 36 running longitudinally of the table. Thus, the carriage 30 is firmly balanced upon the table and is freely movable longitudinally thereof. An upper carriage 40 is mounted so as to be freely movable upon the frame portions 33 of the lower carriage in directions transversely of the movement of the lower carriage; and for this purpose the upper carriage is provided with suitable rollers at 41 and 42 to engage the frame members 34 and 33, respectively. A roller 44 is also carried by the carriage 40 so as to frictionally engage the frame member 33 in the region of the routing mechanism so as to provide desired movements of the upper carriage relative to the lower carriage upon application of power to the roller 44 through a driving shaft 45, as will be explained more fully hereinafter. Thus, the upper carriage 40 is mounted upon the lower carriage 30 so as to be freely movable relative thereto in directions transversely of the longitudinal axis of the center rail 23, and such movement is provided for by means of application of power to the roller 44 as will be explained hereinafter.

A templet tracing device designated generally at 50 is mounted upon the upper carriage 40 at one side of the center rail 23, and a routing device designated generally at 51 is mounted upon the upper carriage 40 so as to be poised above the table 25 at an opposite side portion thereof upon which the stock pieces are mounted. The templet tracer and the router mechanisms are operatively coupled in an improved manner as will be explained hereinafter, whereby whenever the tracer stylus is moved so as to trace the pattern of a templet disposed upon the table at the left side of the center rail as viewed in Figs. 1 and 2 the router device will be caused to duplicate the pattern of the templet upon work pieces which may be fastened down to the table at the right hand side of the center rail thereof.

Figures 3, 4:
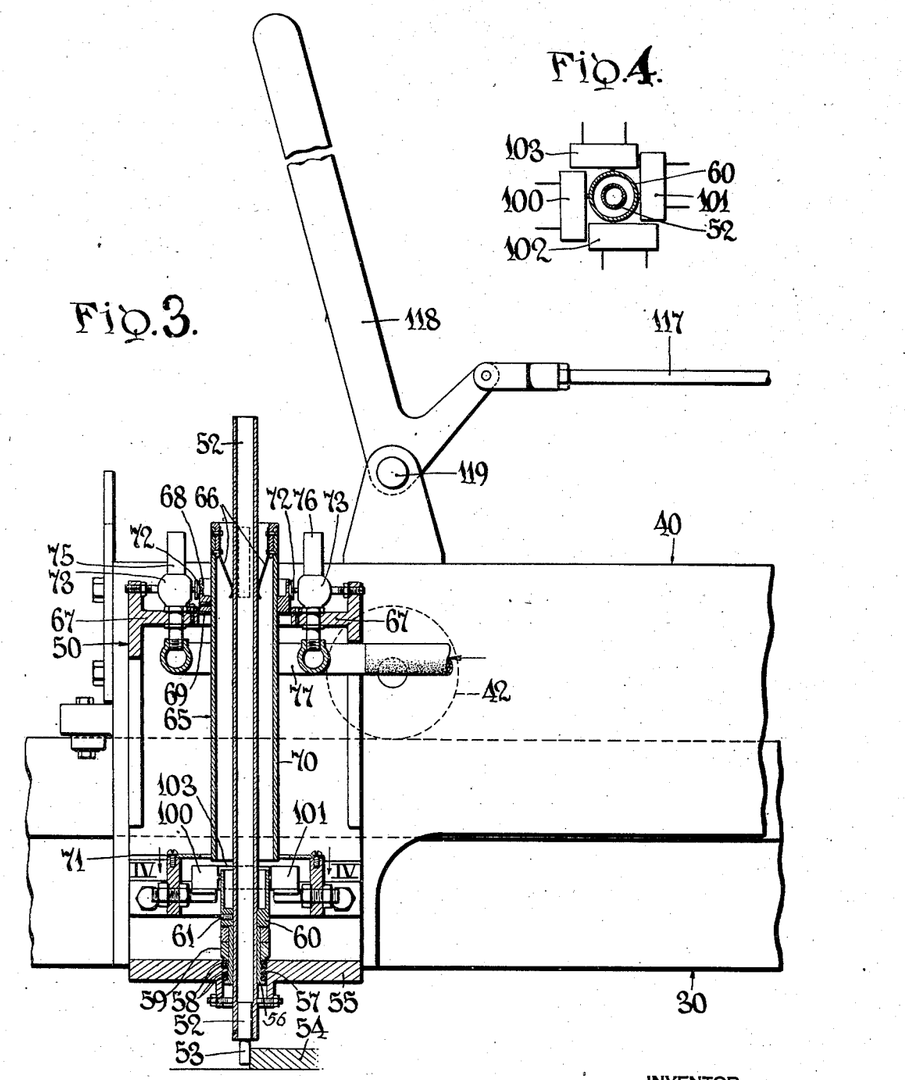
Fig. 3 is an enlarged view of the control mechanism of Fig. 2, with portions thereof shown in section.
Fig. 4 is a fragmentary section taken along line IV—IV of Fig. 3.

The tracing device 50 comprises a control stylus 52 which is in the form of a tubular element having a hardened metal pointer 53 fixed to extend from the lower end thereof so as to be adapted to move against lateral edge portions of a guiding templet as indicated at 54 in closely conforming fashion (Fig. 3). The pointer 53 is preferably proportioned so as to be of approximately the same dimensions as the routing tool which will be referred to more specifically hereinafter. The control stylus 52 is mounted upon the upper carriage 40 by means of an extending bracket portion 55 thereof; the bracket 55 being bored to mount the control stylus device so as to extend therethrough in loosely fitting relation. The stylus 52 is fitted with a bushing 56 in the region of its mounting upon the bracket 55, and the bracket 55 is formed with a reduced annular shoulder 57 which engages the bushing 56 so as to support it thereat against substantial lateral movement. The bracket 55 is also fitted with resilient compression rings 58 above and below the shoulder 57 to further support the stylus 52 but to allow it to be oscillated in any direction about any axis within the plane of the shoulder 57. A pair of spacing collars 59 are mounted upon the stylus 52 above the bracket 55 so that the lower one rests against the uppermost resilient compression ring 58, and a thimble 60 is fixed to the stylus 52 by means of a set screw 61 so as to constitute an integral portion thereof and to be adapted to rest against the upper end of the upper collar 59, thus supporting the stylus 52 vertically upon the bracket 55.

Adjacent its upper end the stylus 52 is supported so as to be normally concentrically disposed within an enclosing tube 65 by means of spring fingers 66 extending radially within the tube 65. The tube 65 is suspended upon a horizontally disposed bracket 67 extending from the upper carriage 40 by means of a collar 68 which is clamped about the tube 65 so as to bear against metallic annulus 69 mounted upon a centrally bored portion of the bracket 67 through which the tube 65 extends. The tube 65 is extended below the region of the spring fingers 66, as at 70, so as to provide a convenient handle adapted to be grasped by the operator of the machine for control of the templet tracing operation. At its lower end the tube 65 extends into association with a bored plate 71 mounted rigidly upon the bracket 55; the plate 71 being adapted to function as a stop device for limiting pivoting movements of the tube 65 upon the annulus 69.

Figure 7:
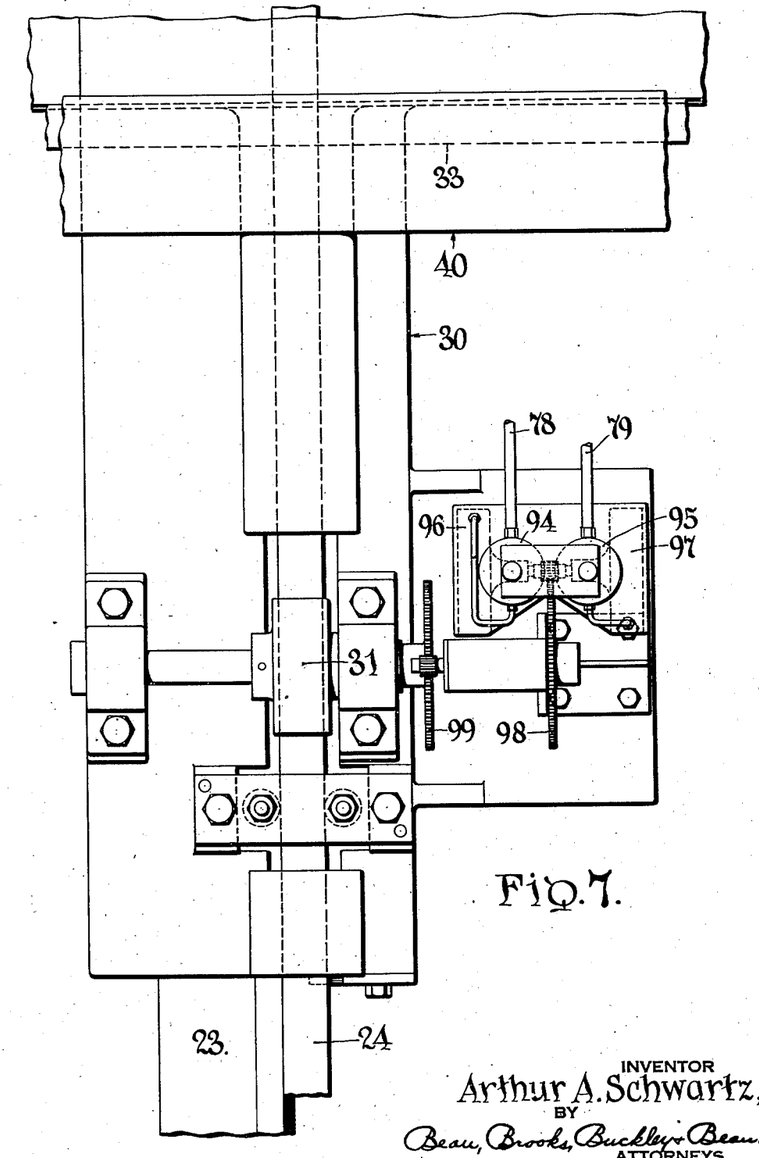
Fig. 7 is an enlarged plan view of the machine in the region of the router carriage and carriage actuating mechanism thereof.
Figure 8:
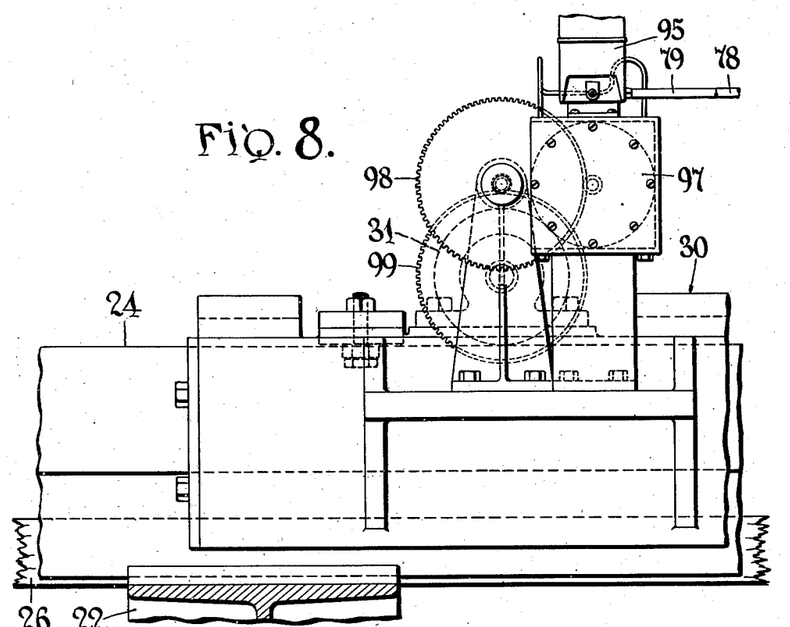
Fig. 8 is a side view of the carriage actuating mechanism of Fig. 7.
Figure 10:
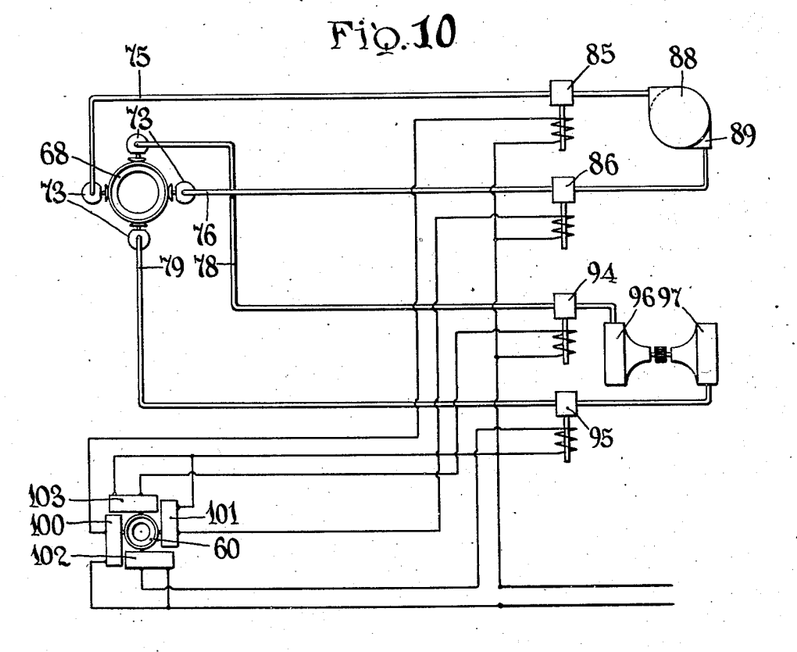
Fig. 10 is a diagram of the control mechanism of the router portion of the machine.

A set of four control fingers 72 are arranged equidistantly about the collar 68 so as to extend radially therefrom in paired relation in directions both longitudinally and transversely of the center rail 23. The two fingers 72 extending transversely of the machine and shown in Fig. 3 are arranged in operative connection with corresponding plunger-type valves 73 which are mounted upon the bracket 67 at corresponding opposite sides of the handle 70 and in spaced relation above the plate 69. Thus, manual movement of the lower handle portion 70 of the tube 65 toward the right as viewed in Fig. 3, for example, will result in pivotal movement of the tube 65 about a horizontal axis in the plane of the annulus 69 so that the collar 68 presses against the valve finger 72 at the left side of the control device as viewed in Fig. 3. Similarly, movement of the handle portion 70 toward the left will produce corresponding movement of the collar 68 in an opposite direction, and such movements of the collar will be transmitted to the associated valve control fingers. The valves 73 are arranged to separately control flow of fluid pressure through corresponding conduits 75 and 76 which lead to the upper carriage moving mechanism, as will be explained hereinafter; the conduits 75 and 76 being fed at opposite sides of the valves 73 by means of an inlet manifold 77 leading from any suitable source of fluid under pressure, such as an air compressing or hydraulic pumping and supply device. The valve members 73 are spring pressed so as to automatically return to off position when pressures thereon from the control handle are released. A second pair of valves 73 of the type described hereinabove are mounted at opposite sides of the control collar 68 so as to be disposed in a line extending longitudinally of the machine for operative association with corresponding control fingers 72 also extending from the control tube collar 68 in opposite directions longitudinally of the machine; the longitudinally disposed valves 73 being arranged to control flow of fluid under pressure through corresponding fluid conduits 78 and 79 (Figs. 7, 8 and 10). The conduits 78 and 79 are also arranged to be fed from the inlet manifold 77 and to convey fluid under pressure therefrom to the lower carriage moving mechanism to operate the latter as will also be explained more fully hereinafter.

The conduits 75 and 76 lead into corresponding valve devices 85 and 86, respectively, which are operatively coupled with corresponding fluid turbines 88 and 89, respectively. The turbines 88 and 89 are mounted upon the upper carriage structure and are operatively connected through suitable gearing indicated at 90 and 91 so as to be adapted to cause the shaft 45 of the roller 44 to rotate in either direction, depending upon which one of the turbines 88 or 89 is in operation at any given time. For this purpose the turbines are so arranged that admission of fluid under pressure through the conduit 75 will cause the turbine 88 to drive the gearing in such manner as to cause the roller 44 to move the upper carriage 40 to the right as viewed in Figs. 1 and 2. Consequently, movement of the control handle 70 so as to open the valve 73 controlling the conduit 75 will cause the upper carriage to be moved toward the right as viewed in Figs. 1 and 2 until the control handle 70 is released to return to its normal valve-closed position under the action of the resilient supporting members of the handle supporting mechanism. The turbine 89 is arranged to drive the gearing in reverse direction and movement of the control member so as to actuate the valve 73 controlling the conduit 76 will thus cause the upper carriage 40 to be moved toward the left as viewed in the figures.

Figure 9:
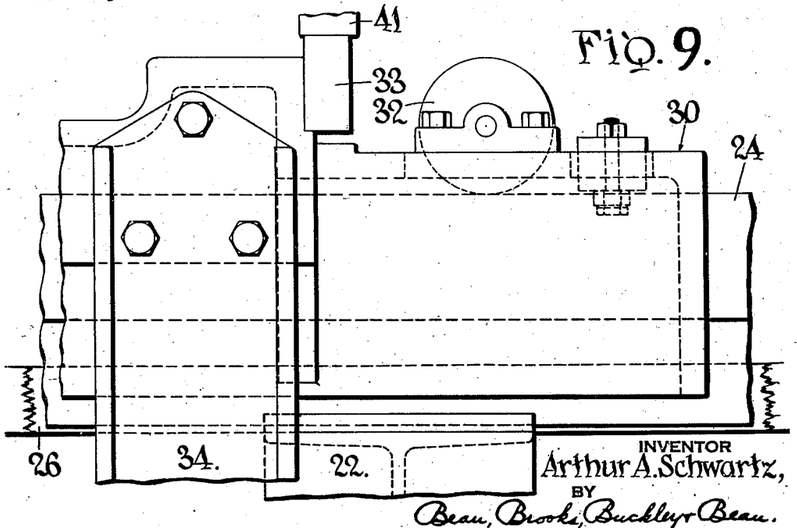
Fig. 9 is a side view of another carriage supporting portion of the machine.

The conduits 78 and 79 lead to corresponding valve devices 94 and 95 which are operatively coupled with a pair of corresponding turbines 96 and 97 mounted upon the lower carriage 30. The turbines 96 and 97 are operatively coupled through means of gearing indicated at 98 and 99 with the roller 31 (Figs. 9 and 10) in such manner that the turbines 96 and 97 are adapted to cause the roller 31 to rotate in either direction, depending upon which one of the turbines is operating at any given time, so as to cause the lower carriage 30 to move longitudinally of the machine upon the center rail 23 and side track devices 36. The conduits 78 and 79 and the corresponding valve control fingers 72 therefore are so arranged that movement of the control handle 70 in a direction pointing toward the top edge of the sheet of Fig. 1, for example, will cause fluid to move under pressure through the conduit 79 so as to operate the turbine 97 to drive the roller 31 so as to move the lower carriage toward the top edge of the sheet of Fig. 1, until such time as the control pressure upon the handle 70 is released. Reversely, the control valve device in connection with the conduit 78 is so arranged that movement of the control handle 70 toward the bottom of the sheet of Fig. 1 will cause the lower carriage 30 to move toward the bottom edge of the sheet of Fig. 1 until the control pressure upon the handle 70 is relieved.

Figures 5, 11:
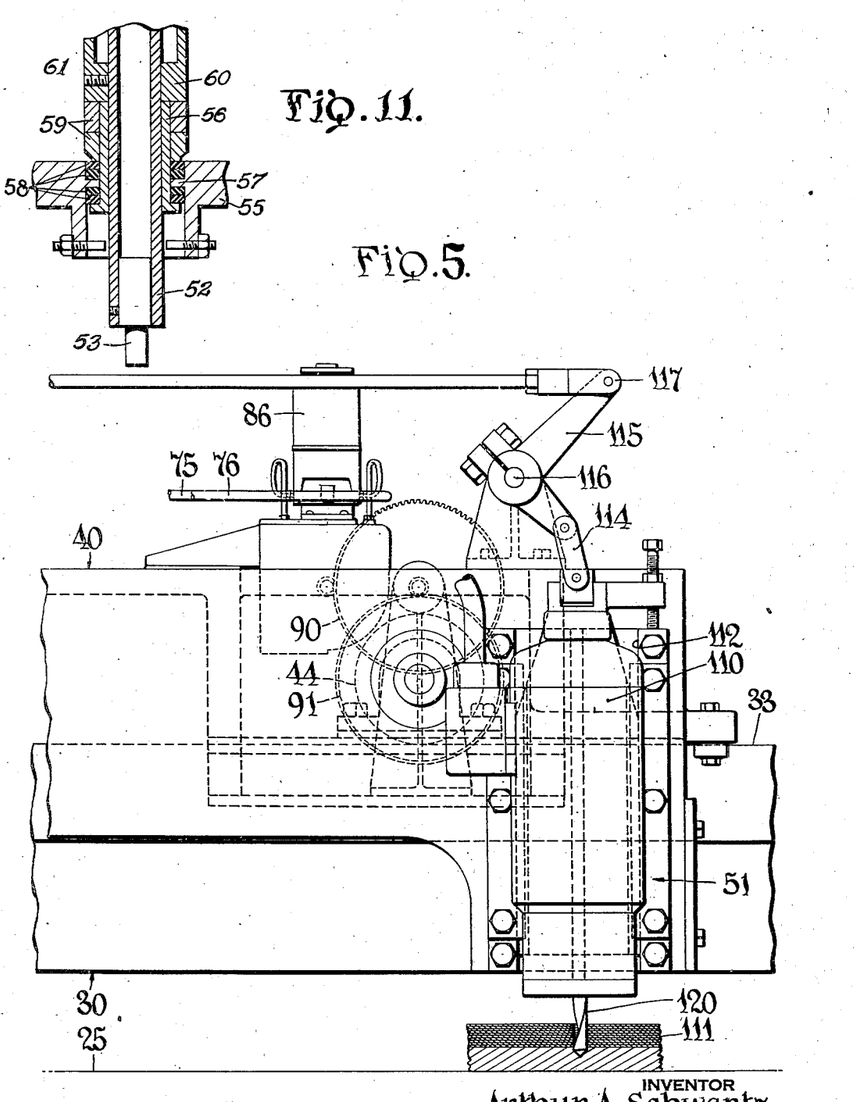
Fig. 5 is an enlarged view of the routing mechanism of Fig. 2.
Fig. 11 is a view similar to the lower portion of Fig. 3 but on a still larger scale.
Figure 6:
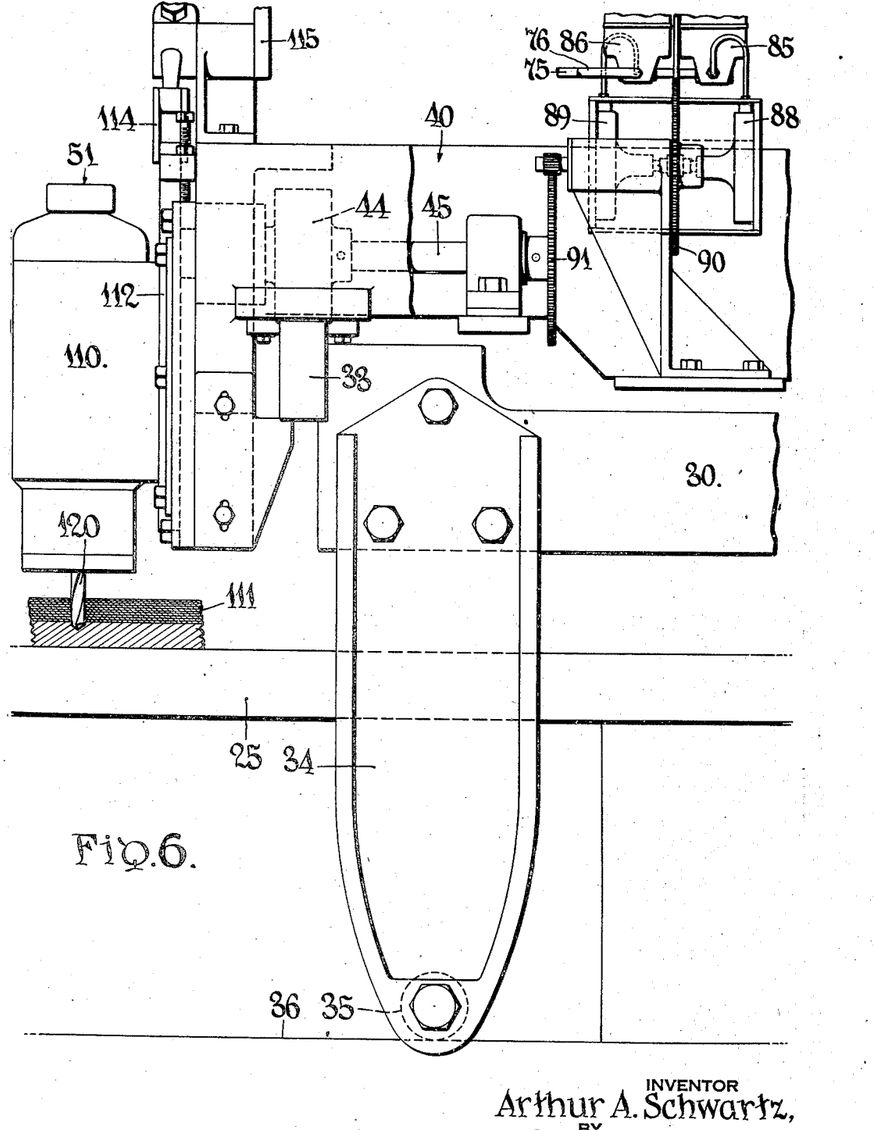
Fig. 6 is a side elevation of the machine in the region of the mechanism of Fig. 5.

The valve devices 85, 86, 94 and 95 are arranged to be normally closed but are equipped with electric solenoid actuating devices (Fig. 10) which are arranged to be actuated to valve open positions in response to relative lateral movement between the control stylus 52 and the tube 65. For example, as illustrated in Figs. 5 and 6, a pair of micrometer switches 100 and 101 are mounted upon the carriage 40 at opposite sides of the thimble 60 and to extend radially therefrom in a line transversely of the longitudinal axis of the machine, whereby movements of the thimble 60 in either transverse direction will cause the corresponding micrometer switch to actuate an associated electrical circuit leading to the corresponding solenoid device of the turbine control valve mechanism. The control mechanism is so arranged that as long as the stylus 52 remains in neutral or concentrically disposed relation within the control tube 65 the micrometer switches 100 and 101 will not be actuated, and the corresponding turbine control valves 85 and 86 will remain in closed condition.

As in the case of the arrangement of the control valve devices 73 as explained hereinabove, a similar second pair of micrometer switches 102 and 103 is arranged radially at opposite sides of the thimble 60 in a line extending longitudinally of the machine (Figs. 4 and 10), and are operatively coupled with the turbine control valves 94—95 so that any pivotal movement of the stylus 52 within the control tube 65 in directions longitudinally of the machine will similarly control carriage movement in either direction longitudinally of the machine. Thus any unintended shifting of the machine carriages will be unattended by power amplification. However, upon application of the slightest lateral pull upon the control handle 70 by the operator of the machine the upper end of the stylus 52 will be moved in reverse direction by the interconnecting fingers 66, and thus the stylus 52 will be pivoted upon the lower supporting shoulder 57 so as to actuate the micrometer switch control mechanism 100—103 so that the control valve mechanisms 85, 86, 94, 95 are actuated to allow passage of fluid under pressure through the conduits 75—79 for operation of the turbine motors in accord with movement of the carriages as called for by such movement of the control handle 70. Thus, the micrometer switch mechanism 100—103 is initially actuated upon application of control forces to the control handle 70 so as to enable the corresponding valve devices 73 to procure the desired corresponding movement of the carriages. Particular attention is called to the fact that the control valve devices 73 are preferably of graduate type whereby the rate of fluid flow to the carriage moving turbines will be regulated by the degree of actuation of the valve control fingers 72. Consequently, the harder the pull by the operator against the handle 70 the greater will be the deflection of the control handle and the amount of fluid supplied to the corresponding operated turbines will be increased, and at all times will be proportionate to the pull supplied by the operator to the handle 70. However, in the event that the carriage movement so procured causes the templet pointer 53 to bear too strongly laterally against the opposing guiding templet the stylus 52 will thus be caused to pivot back upon the shoulder 57 of the bracket 55 against the action of the spring fingers 66, thus causing the thimble 60 to move laterally so as to return the previously actuated micrometer switch or switches into off position. The micrometer switch thereby causes the corresponding solenoid valve control device to be operated to close the corresponding element of the valve mechanism 85, 86, 94, 95, thereby cutting off the supply of fluid pressure power to the corresponding turbine even though the control handle 70 may at the time be pressed into valve actuating position by the operator of the machine.

It will be understood that whereas the control valve devices 73 and the micrometer switch devices 100 to 103 are arranged radially of the associated control elements in directions longitudinally and transversely of the machine and at right angles to one another, control movements of the control handle 70 and/or of the pointer 53, as explained hereinabove, in directions diagonally thereto will result in simultaneous actuation of corresponding adjacent control devices so as to provide a composition of control effects whereby the router carriage will move in a corresponding diagonal direction.

A router head 110 is poised above the stock 111 (Figs. 5 and 6), and for this purpose the head 110 is mounted upon the upper carriage 40 so as to be vertically slidable thereon by means of a slide connection at 112. The upper end of the head 110 is connected through means of a link 114 to a bell crank 115 which is pivotally mounted at 116 upon the upper carriage for operation by a push-pull rod 117 (Fig. 5). Rod 117 connects at its other end (Fig. 3) to control lever 118 which is also pivotally mounted upon the carriage 40 by means of a pivotal connection 119. The lever 118 is located within convenient reach of the operator of the tracer control handle 70, and thus convenient means are provided whereby the operator may raise and lower the routing mechanism into and out of operative position relative to the work.

It will be understood that the router head 110 is adapted to be fitted with any desired type of routing or work cutting tool as at 120, and that suitable motor or other power supplying means will be operatively coupled with the router tool and controlled by any suitable control device, as will be well understood by those versed in the art.

Thus, a novel and improved templet following machine tool is provided wherein the machining element of the mechanism is adapted to automatically duplicate every movement of the templet tracing pointer thereof, and wherein suitable movements of the carriage relative to the guiding templet and the work are obtained by manual application of only minor pressure forces against the control device thereof because of amplification thereof by automatically applied power means. However, the machine is prevented from moving with disruptive or template-overrunning effects as a result of mistakes of judgment by the operator thereof by operation of automatically applied power cut-off controls which function to terminate the supply of carriage moving power whenever the templet tracer is brought to bear unwisely against the templet guiding surfaces.

Thus, the machine of the invention provides mechanism whereby mass production of duplicate sheet metal products may be effected in accord with a simplified and economical and otherwise improved operating method. The sheet metal stock pieces may be initially stacked in superposed relation at one side of the table while one or more templets for guiding the routing operations thereon are mounted on the table oppositely of the center rail thereof.

The stacked work sheets as explained hereinabove may then be secured to the table against lateral displacement from their prearranged aligned stacked position by means of nails or screws or other suitable fastening devices driven through drilled openings and into the supporting table. Then the routing mechanism carriage structure of the machine may be manually directed to move so that the routing guide tracer follows the guiding contour of the templet and the routing cutter correspondingly moves relative to the work sheets while cutting the latter. Manually controlled means for raising and lowering the cutter relative to operative elevation is provided in conjunction with the carriage guiding control device. Movement of the router carriage is provided for in all directions within a plane parallel to the table top, and such movement is effected by manual guiding of a control handle which is operatively coupled with selectively applicable power means adapted to be automatically actuated to amplify the carriage moving forces applied thereto by the operator unless and until such time as such control forces may be ill advisedly applied by the operator laterally against the templet, whereupon the power amplifying means is automatically cut off. Thus, so-called "hunting" operation of the duplicating routing mechanism is avoided, and the mechanism is fool-proof as to its control and operation.

It will be understood that by reason of the features of the method and mechanism of the invention it will no longer be necessary to form laterally projecting ears or other temporary accessory fastening means at the side edge portions of the work sheets in order to enable them to be fixed against lateral displacement during the routing operation, thus eliminating extra forming and handling operations. It will also be understood that the routine of handling the work sheets in connection with the method of the invention is so simplified as compared to methods of the prior art that substantial economies are thus made available to the user of the machine.

Because of the features of the carriage and routing actuating mechanisms full cutting speed is obtainable at all times without fatiguing the operators. The cutter feed is smooth and positive and fool-proof against mistakes in judgment by the operators who are at all times protected from flying chips or other dangerous influences.

Although only one form of the invention has been shown and described in detail, it will be apparent to those skilled in the art that the invention is not so limited but that various changes may be made therein without departing from the spirit of the invention or the scope of the appended claims.

What is claimed is:

1. A duplicating shaping tool including a templet and stock piece supporting platform, a carriage movable relative to said platform and mounting a shaping control tracer in registry with the contours of templet means to be traced, work shaping means mounted upon said carriage in fixed relation therefrom and adapted to duplicate contours of said templet when traced by said tracer, carriage movement control means comprising a lever mounted upon said carriage adapted to be manually urged in the desired direction of carriage movement for partially providing movement thereof relative to said platform, power supply means operatively coupled with said carriage for assisting movement of said carriage relative to said platform, said power supply means being controlled by movements of said control lever relative to said carriage under forces applied manually thereto to complement said manually applied carriage moving forces, and control means operatively associated with said tracer and said power supply means for interrupting operation of the latter whenever said manually directed forces tend to move said carriage in such manner that said tracer bears normally against templet contoured portions.

2. In a machine tool, a fixed base, a carriage movably mounted upon said base, a control member comprising a tubular element flexibly mounted upon said carriage for transmitting manually applied pressure forces therethrough to cause said carriage to move relative to said fixed base, power supply means operably associated with said carriage for complementing the carriage moving forces manually imposed upon said control member, power supply control means operatively connected with said control member so as to be automatically actuated upon movement of said control member relative to said carriage away from control member normal position relative to said carriage, a templet contacting tracer fixed to an extending end portion of a member extending within the interior of said tubular member and resiliently mounted in laterally movable relation therein by resilient mounting means, said tracer extending member being operatively associated with second control means adapted to control the operation of said power supply means in such manner that whenever said control member is shifted out of axial alignment with the normal attitude of said tracer extending member said power supply means is operated to assist the manually applied forces acting upon said control member.

3. A machine tool including a stationary portion and a carriage portion movable relative thereto, carriage movement control means flexibly mounted upon said carriage and comprising a manually operable control element movably mounted upon said carriage and adapted to be submitted to manually applied forces for moving said control element relative to said carriage and simultaneously transmitting said manually applied forces to said carriage for urging the latter to move relative to said stationary portion, a guide contact member movably mounted upon said carriage and normally maintained in a neutral position by resilient means and having a portion extending into engagement with said control element, motor means operatively coupled with said stationary portion and said carriage for providing relative movement therebetween, motor control means mounted upon said carriage and in registry with said guide contact member and operatively coupled with said motor means for causing the latter to move said carriage in directions consonant with the direction of application of forces applied manually to said control element as long as said guide contact member is disposed away from said neutral position relative to said carriage in response to deflection forces applied thereto through said control element, and second motor control means mounted upon said carriage and in registry with said control element for actuation thereby to adjustably control the power output of said motor means in accord with adjustable actuation of said second power control means in accord with the magnitudes of pressure forces applied manually to said control element.

4. A duplicating machine tool comprising a base, a carriage mounted for movement relative to said base, motor means operatively coupling said base and said carriage for assisting in such relative movement, a manually operable control member movably mounted upon said carriage and normally disposed in neutral control position relative thereto by resilient mounting means, motor control means mounted upon said carriage adjacent said control member for actuation thereby upon deflection of said control member from said neutral position, a tracer adapted to contact carriage movement guiding templet means mounted upon said base upon movement of said carriage relative to said base, said tracer being movable relative to said carriage upon impact of said tracer against said templet, and second motor control means mounted upon said carriage adjacent said tracer and adapted to be actuated by movement of the latter relative to said carriage between motor operative and inoperative control conditions.

ARTHUR A. SCHWARTZ.